Aug. 21, 1945.   R. T. EVANS ET AL   2,383,182
TRACTOR HITCH
Filed April 16, 1945
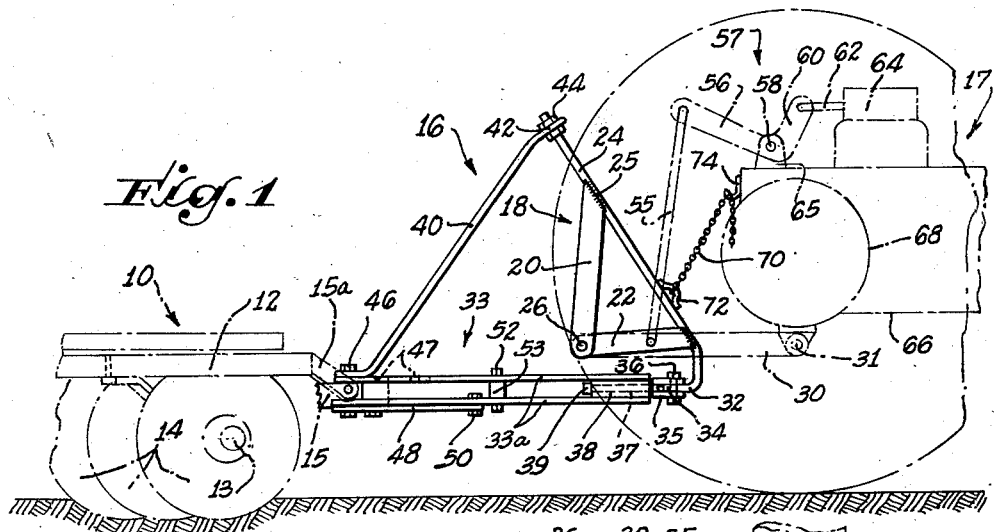
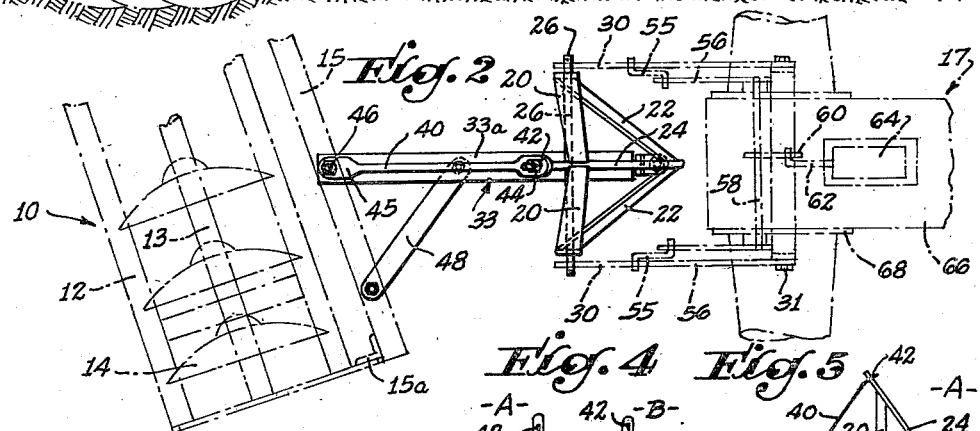
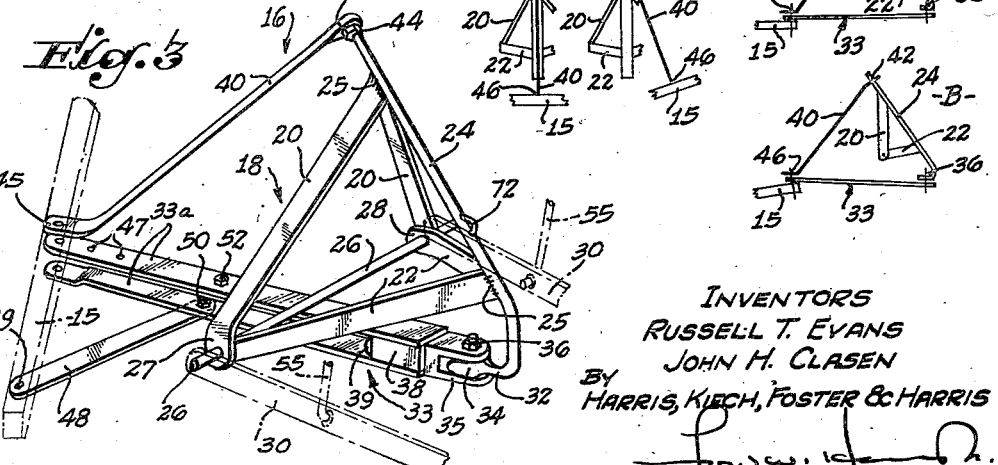
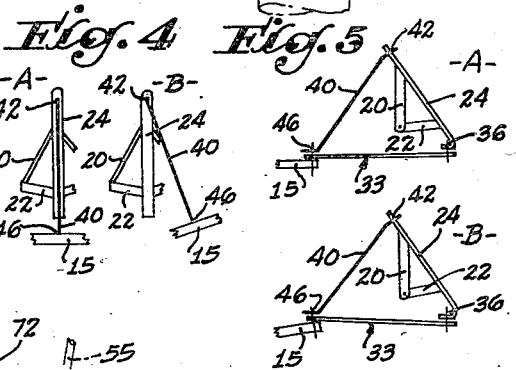
INVENTORS
RUSSELL T. EVANS
JOHN H. CLASEN
BY HARRIS, KIECH, FOSTER & HARRIS
FOR THE FIRM
ATTORNEYS Patented Aug. 21, 1945

2,383,182

UNITED STATES PATENT OFFICE 2,383,182

TRACTOR HITCH

Russell T. Evans and John H. Clasen,
Anaheim, Calif.

Application April 16, 1945, Serial No. 588,636

19 Claims. (Cl. 280—33.44)

This invention relates to devices, commonly known as "hitches," for attaching trailing implements to draft vehicles such as tractors, and particularly for use with the usual offset type of disk harrow.

The principal object of the invention is to overcome difficulties encountered in making right-hand turns with the ordinary disk harrows and to improve traction.

Disk harrows are commonly built with two series of cupped disks mounted on axles disposed angularly to the direction of travel to form a triangular structure, the two series converging at the left of the harrow so that the diverging end of the forward series is foremost and at the right, the diverging end of the rearward series commonly being hindmost and also at the right. The cups of the forward disks are thus directed forward and to the right. On left-hand turns, this disposition of the cups facilitates turning, but on right-hand turns, the foremost disks in particular are faced squarely in the direction of turn, with the result that they gouge deeply into the soil and not only offer undue resistance to the tractive vehicle but also destroy the smooth harrowed surface that is desired. The sharper the turn, the deeper the gouges usually are, which is a serious objection in many instances where sharp turns are necessary, as when disking orchards.

It is, therefore, a particular object of this invention to provide for the avoidance of the gouging of the forward disks into the soil when making right-hand turns, and it is especially an object to provide mechanism which will automatically lift the foremost disks from the soil upon commencing a turn.

A specific object is to provide means whereby the relative movement between the tractive vehicle and the harrow when making turns will itself produce the desired automatic lift of the foremost corner of the harrow.

These objects are accomplished through the medium of a hitch frame which includes an inclined positioning bar fixed against lateral movement and extending from a lower forward point upward and rearward with respect to the direction of travel, its upper, rear end having a depending lifting link pivotally mounted thereon. The frame is adapted for mounting upon elevating and pulling mechanisms commonly provided on farm tractors. The forward end of the positioning bar when in readiness for use has the forward end of a draft tongue loosely pivoted thereon, and the lower end of the lifting link is connected with a rear portion of the draft tongue adjacent a point of attachment of the latter to the disk harrow. Upon relative turning movement between the tractor and the harrow, the lateral movement of the rear portion of the tongue about the point of its pivotal mounting on the lower end of the positioning bar as a center causes the lifting link to swing about its pivotal mounting on the upper end of the positioning bar as a center, which correspondingly lifts the lower end of the link and consequently lifts the rear portion of the draft tongue and the adjacent corner of the harrow. The sharper the angle of turn, the greater is the swing of the lifting link and the greater the elevation of the foremost harrow disks. This result occurs because the swinging movement of the draft tongue and the lifting link is about an inclined axis provided by the inclined positioning bar, the path of the point of attachment of the link and the tongue being in a plane perpendicular to that inclined axis.

Further objects which are obtained by constructions of this invention are improvement of traction and facilitation of turning, not only with disk harrows but also with other drawn implements. Improvement of traction is accomplished through the provision of a secondary pull point at an elevated position, this being afforded at the point of attachment of the upper end of the lifting link to the upper end of the positioning bar or uppermost portion of the hitch frame. In this manner a portion of the forward weight of the implement is transferred through the hitch frame to the rear wheels of the tractor drawing the implement. Turning is facilitated not only by the described lifting action, but also by placing the primary pull point closer to the tractor than usual, thereby shortening the turning radius. This location is provided by the attachment of the draft tongue to the lower forward portion of the hitch frame and its positioning bar, the lower rearward portion of the hitch frame being mounted upon the mentioned elevating and pulling mechanism of the tractor.

Other objects and features of the invention will be apparent to those skilled in the art upon reference to the following specification and accompanying drawing.

In this drawing,

Fig. 1 is a side elevation showing the hitch of the present invention in operative relation with a disk harrow and a conventional tractor having hydraulic lift mechanism, the harrow and the tractor being represented in broken lines;

Fig. 2 is a plan view showing the same relationship as in Fig. 1;

Fig. 3 is a perspective view of the hitch;

Fig. 4 is a diagrammatic view showing in rear elevation the normal and turning positions of the parts of the hitch; and Fig. 5 is a corresponding diagrammatic view in side elevation showing the normal and turning positions of the parts of the hitch.

In Figs. 1 and 2, the forward corner of a conventional disk harrow 10 is illustrated, the usual angular relationship of a forward frame 12 and a forward shaft 13 with respect to the direction of travel being represented, and the consequent pitch of cup-shaped disks 14 on the shaft 13 with respect to the direction of travel also being indicated. The frame 12 is also shown as having a forward transverse attachment bar 15 connected with the principal part of the frame 12 by connecting brackets 15a. The hitch of this invention which is generally indicated at 16 is shown in operative position whereby the harrow 10 is connected through the attachment bar 15 to a conventional farm tractor 17.

The hitch 16 comprises a trihedral frame 18 which is composed of two upwardly extending converging arms 20, forming a structure commonly referred to in the industry as an "A-frame," a pair of forwardly extending substantially horizontal converging arms 22, and an inclined supporting and positioning bar 24 which is secured to both pairs of arms 20 and 22 at their points of convergence as by welding 25. The diverging ends of the two pairs of arms 20 and 22 are carried on the ends of a transverse supporting shaft 26, lower extremities 27 of the arms 20 and rearward extremities 28 of the arms 22 preferably lying in contact with one another and being welded together for rigidity, if desired. The trihedral frame 18 is adapted to be mounted upon and carried by conventional lifting and tractive arms 30 in whose rear ends the ends of the shaft 26 are journaled, the forward ends of the tractive arms 30 being pivoted at 31 to a suitable portion of the framework of the tractor 17 for draft purposes.

The arrangement of the positioning bar 24 of the frame 18 is such that the rearward end portion of the bar 24 is its uppermost portion, and its forward end portion 32 is its lowermost portion. This forward lowermost portion 32 extends down below the frame arms 22 and the shaft 26 sufficiently for a draw bar in the form of a draft tongue 33 to clear the under sides of the arms 22 and the shaft 26. The draft tongue 33 is connected to the lower portion 32 of the bar 24 through the medium of an eye 34 which is loosely positioned between the bifurcations of a clevis 35, a pivot bolt 36 passing through the eye 34 and the clevis 35 to provide a loose joint such that the draft tongue 33 may swing laterally in both directions and also provide for a limited amount of rising and falling motion. The clevis 35 is provided with a stem 37 that extends rearward through a block 38 and forms a swivel connection therewith, the stem 37 carrying a suitable retaining head 39. The block 38 is suitably secured, as by welding, between two spaced bars 33a which constitute the body portion of the draft tongue 33.

The arrangement of the positioning bar 24 of the frame 18 is such that the rearward end portion of the bar 24 is its uppermost portion, and its forward end portion 32 is its lowermost portion. This forward lowermost portion 32 extends down below the frame arms 22 and the shaft 26 sufficiently for a draw bar in the form of a draft tongue 33 to clear the under sides of the arms 22 and the shaft 26. The draft tongue 33 is connected to the lower portion 32 of the bar 24 through the medium of an eye 34 which is loosely positioned between the bifurcations of a clevis 35, a pivot bolt 36 passing through the eye 34 and the clevis 35 to provide a loose joint such that the draft tongue 33 may swing laterally in both directions and also provide for a limited amount of rising and falling motion. The clevis 35 is provided with a stem 37 that extends rearward through a block 38 and forms a swivel connection therewith, the stem 37 carrying a suitable retaining head 39. The block 38 is suitably secured, as by welding, between two spaced bars 33a which constitute the body portion of the draft tongue 33.

An inclined lifting link 40 has one end thereof swingingly mounted upon the upper rearward end of the positioning bar 24, this mounting being accomplished through the medium of an eye 42 formed on the upper end of the link 40 through which the upper end of the bar 24 projects, suitable retaining nuts 44, or the like, being secured to the bar 24 upon opposite sides of the eye 42 whereby to maintain the relation of the parts. The lower end of the lifting link 40 is desirably flattened and apertured to provide an eye 45 adapted to receive an attaching bolt 46 which passes through both the eye 45 and the adjacent ends of the spaced tongue-forming bars 33a. In the form shown, the lower tongue-forming bar 33a is held in position on the underside of the transverse attachment bar 15 of the harrow frame 12, the upper tongue-forming bar 33a being held upon the top of the attachment bar 15, and the eye 45 of the lifting link 40 being held upon the end of the upper tongue-forming bar 33a, the bolt 46 serving to bind the eye 45 and the ends of the tongue-forming bars 33a upon the attachment bar 15. If desired to adjust the angularity of the positioning bar 24, any suitable means may be employed, such as adjusting holes 47 formed in the upper tongue-forming bar 33a whereby the eye 45 may be selectively connected by a short bolt; or other means for varying the effective length of the lifting link 40 may be used. Suitable play at the eyes 34 and 42 will accommodate such adjustment.

For proper maintenance of the position of the draft tongue 33 with respect to the harrow frame 12, a conventional bracing arm 48 is provided, one end of which is secured by a bolt 49 to the attachment bar 15 and the other end of which is secured by a bolt 50 to the lower tongue-forming bar 33a. In order to insure adequate bracing of the tongue 33 by the bracing arm 48, the two bars 33a are bound together by a bolt 52 cooperating with a spacer 53, these parts being located closely adjacent the bolt 50.

By the described arrangement of the trihedral frame 18, including the positioning bar 24, with the lifting link 40 and the draft tongue 33, the hitch 16 is adapted for connection in a conventional manner with the conventional harrow 10, the conventional bracing being provided by the arm 48. Also, by mounting the trihedral frame 18 upon the transverse supporting shaft 26, the structure is adapted for being supported upon the conventional power operated lifting and tractive arms 30. The arms 30 may be supported and actuated in a conventional manner through the medium of conventional links 55 which are in turn actuated by arms 56 of a forked bell crank 57 including a rock shaft 58 and a control arm 60 suitably connected as by means of a rod 62 with a conventional or other hydraulic lift mechanism 64. As indicated, the rock shaft 58 is mounted in ears 65, these ears and the hydraulic lift mechanism 64 being carried upon a conventional tractor housing 66 adjacent to a conventional differential housing 68. By these means the hitch 16 together with its trihedral frame 18 are adapted to be elevated in a conventional manner by the driver of the tractor through his manipulation of the hydraulic lift mechanism 64, and may be similarly lowered as required. In order to limit the lowering of the hitch 16 and consequent penetration of the disks 14 into the soil, a flexible chain 70 is employed which is secured to an eye 72 welded in place upon an intermediate portion of the positioning bar 24. The free end of the chain 70 is adapted to be adjustably engaged over a hook 74 carried by a rear portion of the tractor housing 66. In this manner any desired limit of penetration of the disks 14 may be accomplished.

In employing the hitch 16 of the present invention the function of pulling the harrow 10 during straight line movement is performed in substantially the same manner as with other types of hitches. The draft influence of the tractor 17 to the lifting and tractive arms 30 is transmitted through the shaft 26 to the frame arms 20 and 22 and thence to the positioning bar 24, whence the principal draft is transmitted through the lower portion 32 of the positioning bar 24 to the forward end of the draft tongue 33 which then serves to draw the harrow 10 forward. When the harrow is to be turned, the turning movement of the tractor 17, which necessarily provides the turning movement of the harrow, causes the draft tongue 33 to swing correspondingly laterally about its pivot point on the pivot bolt 36 by which it is connected to the positioning bar 24. When the turn is to the left, the normal turning movement is facilitated by the indicated pitch of the disks 14, which movement is further aided by the action of the present hitch. The special advantage of the present hitch, however, is obtained when a turn is made to the right. Under such circumstances, as has been indicated above, the normal tendency of the foremost disks 14 is to gouge deeply into the soil due to the fact that the cupped sides of the foremost disks 14 are faced generally in the direction in which the right turn is being made. With the present construction, when a right turn is commenced, an angular position of the draft tongue 33 with respect to the longitudinal axis of the tractor 17 is developed, the tongue 33 swinging laterally about the pivot bolt 36, so that the lifting link 40 of the hitch 16 swings to the right on an arc about its pivot point 42 as a center from the normal position indicated in position A of Fig. 4 to the laterally offset position indicated in position B of Fig. 4. This arcuate movement produces elevation at the attachment point 46 of Fig. 4 and causes corresponding elevation of the forward corner of the harrow 10 by reason of the lifting action of the link 40 upon the transverse attachment bar 15. The points 42 and 46 of Figs. 4 and 5 are representative of the eye 42 and the attaching bolt 46 of Figs. 1, 2, and 3. The extent of this lift is measured by the difference in distance between the two positions of the attaching point 46 in positions A and B of Fig. 4. This extent of lift is also indicated diagrammatically in Fig. 5, the normal lowered position being indicated in position A and the elevated position being indicated in position B in conformity with position B of Fig. 4. This accomplishment of elevation of the attachment point 46 is due to the fact that the draft tongue 33 and lifting link 40 swing as a unit about the inclined axis provided by the positioning bar 24. It is apparent that because of this operation, the sharper the angle of turn, the greater is the angularity which the draft tongue 33 assumes with respect to the longitudinal axis of the tractor, and, as a consequence, the greater is the elevation of the attachment point 46. As a result of this increasing amount of elevation as the sharpness of the turn is increased, the foremost disks 14 are lifted entirely out of the soil when the angle of turn is great enough. When the turn has been completed and the tractor straightens out with respect to the axis of travel of the harrow, the parts assume their normal pulling positions, as indicated in positions A of Figs. 4 and 5.

Thus, satisfactory lifting of the foremost disks 14 of the harrow 10 is automatically accomplished by the movement of the tractor 17 with respect to the harrow 10 when making turns, the making of sharp turns being possible and being greatly facilitated by the complete lifting of the disks 14 from engagement with the soil.

The present hitch construction is useful with other tools than disk harrows, especially because it possesses further advantages, one of which is found in the attachment of the draft tongue 33 by the pivot bolt 36 to the lower forward portion of the frame 18 provided by the lower portion 32 of the inclined positioning bar 24. This connection places the point of primary pull on the implement in a position closer to the tractor than usual, and well ahead of the points of connection of the lifting and tractive arms 30 with the ends of the supporting shaft 26. The result is a much shorter effective turning radius than possible with conventional A-frame hitches.

Another important advantage is the improved traction provided by transfer of a portion of the forward weight of the drawn implement to the rear tractor wheels through the elevated secondary pull point provided where the inclined arm 24 receives the eye 42 of the lifting link 40.

Inasmuch as many variations of the generic invention herein disclosed will become apparent to those skilled in the art, it is intended to cover all modifications within the scope of the appended claims.

We claim as our invention:

1. In combination in a hitch for connecting a drawn implement with a tractive vehicle; a framework; an inclined positioning and supporting bar connected with said framework and extending upward and rearward from a forward part; a substantially horizontal draft tongue swingingly connected with a forward portion of said bar, a rear portion of said tongue being adapted for connection to the drawn implement; a lifting link having an upper end swingingly connected with the upper end of said supporting bar, its lower end being connected with a rearward portion of said tongue; and means for supporting said framework from a tractive vehicle.

2. In combination in a hitch for connecting a drawn implement with a tractive vehicle; a frame having an upper rearward portion and a lower forward portion; means for supporting said frame on a tractive vehicle; a tongue having a forward portion swingingly connected with said lower forward portion of said frame and a rearward portion adapted to be connected with a drawn implement; and a lifting link having an upper portion swingingly connected with said upper rearward portion of said frame and a lower portion connected with a rearward portion of said tongue.

3. In combination in a hitch for connecting a drawn implement with a tractive vehicle; a trihedral frame having a forward lower corner; means for supporting said frame from a tractive vehicle and applying draft to said frame; a draft tongue having a forward portion swingingly connected with said forward corner of said frame and a rearward portion adapted to be connected with a drawn implement; and lifting means having an upper portion swingingly connected with said frame adjacent its apex and a lower portion connected with a rearward portion of said tongue whereby to impart a lifting effect to the drawn implement.

4. In combination in a hitch for connecting a drawn implement with a tractive vehicle; a framework having upwardly converging frame members and forwardly converging frame members; a supporting member connecting diverging ends of said frame members; an inclined positioning member connected with converging portions of said forwardly converging frame members and with converging portions of said upwardly converging frame members; draft means movably connected with a forward portion of said inclined positioning member and having a rearward portion adapted to be connected with a drawn implement; and means for supporting said framework from a tractive vehicle.

5. A combination as in claim 4, including means connected with said inclined positioning member and adapted to be connected with a tractive vehicle for limiting downward movement of said framework.

6. A hitch for connecting a drawn implement with a tractive vehicle, comprising: A transverse support; a pair of approximately horizontal arms having rearward portions connected with said support and having forwardly extending portions; a second pair of arms having lower portions connected with said support and having upwardly extending portions; inclined positioning means connected with said forwardly extending portions and with said upwardly extending portions; tractive means connected with said support for imparting tractive force to said positioning means; draft means having a forward portion loosely connected with a forward portion of said positioning means and having a rearward portion adapted to be connected to a drawn implement; and lifting means having an upper portion loosely connected with a rearward portion of said positioning means, and having a lower portion adapted to be connected with said drawn implement.

7. A combination as in claim 6 wherein the forward portion of said positioning means with which said draft means is connected extends below the position of said approximately horizontal arms.

8. A combination as in claim 6 wherein said lower portion of said lifting means and said rearward portion of said draft means are connected.

9. In combination in a hitch for connecting a drawn implement with a tractive vehicle: a frame including a relatively fixed inclined positioning bar having a forward lower portion adapted to be swingingly connected with the forward end of a draw bar and a rearward upper portion; and a depending supporting link having an upper end swingingly connected with said upper and rearward portion and having a lower end adapted to be connected with a rear portion of said draw bar.

10. In combination in a hitch: a frame having an upper rearward portion and a lower forward portion; supporting means extending below said lower forward portion; draft means swingingly connected with said supporting means in position to clear said lower forward portion of said frame; and depending supporting means swingingly connected with said upper rearward portion of said frame, said depending supporting means extending to a position below the lower portion of said frame and connected with a rear portion of said draft means whereby said draft means and said swinging supporting means will permit swinging motion of said draft means clear of said frame.

11. In combination: power lift mechanism for a tractive vehicle including lifting means mounted on said vehicle and means for elevating extending portions of said lifting means; a frame carried upon said extending portions of said lifting means and adapted to be elevated thereby, said frame having an upper rearward portion and a lower forward portion; draft means having a forward portion swingingly connected with the lower forward portion of said frame and having a rearward portion adapted to be connected to a drawn implement; and a lifting link having an upper portion swingingly connected with said upper rearward portion of said frame and a lower portion connected with a rearward portion of said draft means.

12. A combination as in claim 11 including flexible limiting means connected with said frame and adapted to be adjustably connected with a relatively stationary portion of said vehicle.

13. A combination as in claim 2 including flexible limiting means connected with said frame and adapted to be adjustably connected with a relatively stationary portion of said vehicle.

14. A hitch comprising in combination: a frame providing an elevated relatively fixed point of attachment and adapted to be connected with and supported by a tractive vehicle; depending means swingingly connected to said frame at said elevated point and adapted for connection to a drawn implement at a corner thereof normally lying lower than said elevated point whereby to elevate said corner upon swing of said depending means; and draft means extending forward of said depending means and adapted for lateral swinging draft connection with said vehicle at its forward end and for draft connection at its rearward end with said drawn implement.

15. A hitch for connecting a drawn implement with a tractive vehicle comprising in combination: a relatively fixed frame including a relatively fixed inclined member disposed in the line of travel of said vehicle, and having its forward portion in a lower position and its rearward portion in an upper position; a draft member having a rearward portion adapted to be connected to said implement and a forward portion swingingly connected with said forward portion of said inclined member; and swinging means swingingly connected with said upper rearward portion of said inclined member and depending therefrom, a lower portion of said swinging means being connected with a rearward portion of said draft member, whereby said draft member and said swinging means may swing as a unit about an inclined axis provided by said inclined member; and means for connecting said frame with said tractive vehicle.

16. In combination: a tractive vehicle; a frame attached to said vehicle and providing an elevated relatively fixed point of attachment; a trailing implement having a corner adapted to be lifted when said vehicle turns; draft means connected with said implement and swingingly connected with said tractive vehicle; and depending means swingingly connected with said frame at said relatively fixed point of attachment and having a lower portion connected with said implement adjacent said corner.

17. A combination as in claim 16 wherein said draft means is connected with said implement adjacent said corner.

18. In combination in a hitch for connecting a drawn implement with a tractive vehicle: a frame having an upper portion, a lower rearward portion, and a lower forward portion; means on said lower rearward portion for connection with said vehicle; means on said lower forward portion for connection with a draft tongue of a drawn implement; and a lifting link connected with said upper portion and adapted for connection with said implement.

19. A combination as in claim 18 including a draft tongue having a forward portion connected with said forward lower portion of said frame, a rearward portion of said draft tongue being connected with a lower portion of said link.

RUSSELL T. EVANS.
JOHN H. CLASEN.